United States Patent
Kurozumi et al.

(10) Patent No.: US 8,134,679 B2
(45) Date of Patent: Mar. 13, 2012

(54) LIQUID CRYSTAL DISPLAY DEVICE

(75) Inventors: Yukio Kurozumi, Mie (JP); Makoto Kanbe, Nara (JP); Yoshitaka Hibino, Mie (JP); Yasuo Minami, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 402 days.

(21) Appl. No.: 12/440,907

(22) PCT Filed: Jun. 6, 2007

(86) PCT No.: PCT/JP2007/061462
§ 371 (c)(1),
(2), (4) Date: Apr. 8, 2009

(87) PCT Pub. No.: WO2008/032481
PCT Pub. Date: Mar. 20, 2008

(65) Prior Publication Data
US 2010/0073619 A1    Mar. 25, 2010

(30) Foreign Application Priority Data

Sep. 11, 2006 (JP) .................................. 2006-245065

(51) Int. Cl.
*G02F 1/1339* (2006.01)
(52) U.S. Cl. ........................................ 349/156; 349/155
(58) Field of Classification Search ........................ None
See application file for complete search history.

(56) References Cited

U.S. PATENT DOCUMENTS

| | | | |
|---|---|---|---|
| 5,459,598 A | 10/1995 | Carrington | |
| 6,433,852 B1 | 8/2002 | Sonoda et al. | |
| 7,508,481 B2 * | 3/2009 | Whitehead et al. | 349/153 |
| 7,570,338 B2 * | 8/2009 | Yoon et al. | 349/155 |
| 7,659,960 B2 * | 2/2010 | Doi et al. | 349/155 |
| 2002/0191141 A1 | 12/2002 | Liao | |
| 2004/0114090 A1 | 6/2004 | Washizawa et al. | |
| 2005/0122464 A1 * | 6/2005 | Lu | 349/190 |
| 2006/0044499 A1 | 3/2006 | Sugiura et al. | |
| 2006/0066766 A1 | 3/2006 | Tanaka et al. | |
| 2006/0181667 A1 | 8/2006 | Doi et al. | |
| 2006/0281211 A1 | 12/2006 | Yoon et al. | |
| 2006/0285062 A1 | 12/2006 | Kim et al. | |

FOREIGN PATENT DOCUMENTS

| | | |
|---|---|---|
| JP | 2000-199904 A | 7/2000 |
| JP | 2005-258137 A | 9/2005 |
| JP | 2006-208728 A | 8/2006 |
| JP | 2006-350306 A | 12/2006 |
| WO | WO 2008/032481 A1 | 3/2008 |
| WO | WO-2008/044364 A1 | 4/2008 |

OTHER PUBLICATIONS

US Office Action dated Sep. 6, 2011 mailed in U.S. Appl. No. 12/306,941.

* cited by examiner

*Primary Examiner* — Tina Wong
(74) *Attorney, Agent, or Firm* — Birch, Stewart, Kolasch & Birch, LLP

(57) ABSTRACT

A liquid crystal display device (50a) includes: an active matrix substrate (20a) having a plurality of gate lines (1a) extending in parallel with each other; a counter substrate (30a) arranged so as to face the active matrix substrate (20a); a liquid crystal layer (25) interposed between the active matrix substrate (20a) and the counter substrate (30a); and spherical spacers (21) disposed between the active matrix substrate (20a) and the counter substrate (30a) so as to overlap each gate line (1a), for defining a thickness of the liquid crystal layer (25). A protruding wall (9a) is provided over each gate line (1a) of the active matrix substrate (20a) so as to surround the spacers (21).

10 Claims, 6 Drawing Sheets

LIQUID CRYSTAL DISPLAY DEVICE

TECHNICAL FIELD

The present invention generally relates to a liquid crystal display device. More particularly, the present invention relates to a liquid crystal display device that is manufactured by disposing spherical spacers between a pair of substrates provided so as to face each other.

BACKGROUND ART

Liquid crystal display devices have been widely used in cellular phones and liquid crystal televisions because of their small thickness and low power consumption. Especially, an active matrix driving liquid crystal display device having a switching element at every pixel as a minimum unit of image display can reliably turn on each pixel and therefore can display a high definition moving picture.

The active matrix driving liquid crystal display device is formed by components such as a liquid crystal display panel. The liquid crystal display panel has an active matrix substrate including, for example, a thin film transistor (hereinafter, referred to as "TFT") in every pixel as a switching element, a counter substrate provided so as to face the active matrix substrate and including a color filter, and a liquid crystal layer interposed between these substrates. The thickness of the liquid crystal layer, that is, the cell thickness, is defined by spacers held between the active matrix substrate and the counter substrate.

For example, Patent Document 1 discloses a liquid crystal display panel using spherical bead spacers as spacers defining the cell thickness. In this liquid crystal display panel, a protruding partition wall for preventing the bead spacers from moving into pixels is formed at the boundary between each pixel and a black matrix on a substrate on which the beads spacers are disposed. Patent Document 1 describes that this structure can suppress defective display due to light leakage and abnormal orientation caused by movement of the bead spacers.

Patent Document 1: Japanese Patent Laid-Open Publication No. 2005-258137

DISCLOSURE OF THE INVENTION

Problems to be Solved by the Invention

In the manufacturing technology of liquid crystal display devices, it has been considered to position such spherical spacers at predetermined positions on one substrate of a liquid crystal display device by an inkjet method.

FIG. 11 is a schematic cross-sectional view of a conventional liquid crystal display device 150 having spherical spacers disposed by an inkjet method.

In this liquid crystal display device 150, as shown in FIG. 11, spherical spacers 121 are disposed by an inkjet method on seats formed by gate lines 111$a$ or the like on an active matrix substrate 120. However, the spacers 121 may fall off the gate lines (seats) 111$a$ due to, for example, vibration during transportation after completion of manufacturing. In this case, the cell thickness is reduced in a region where the spacers 121 have fallen off, making the overall cell thickness uneven. The display quality of the liquid crystal display device 150 is therefore significantly degraded. Note that, in FIG. 11, 110$a$ and 110$b$ indicate a substrate main body and 116$b$ indicates a black matrix.

In a liquid crystal display device in which the partition walls disclosed in Patent Document 1 are formed in a region where spacers are disposed, two partition walls extending in parallel with each other restrain movement of the spacers along a width direction of the partition walls when vibration is applied to the liquid crystal display device. However, the partition walls do not restrain movement of the spacers along a length direction of the partition walls. The spacers may therefore move along the length direction between the two partition walls and gather at the ends of the partition walls. This causes an uneven cell thickness. Especially a large screen liquid crystal display device has long partition walls and a large number of spacers are disposed between the partition walls. Accordingly, such an uneven thickness is a greater concern for large screen liquid crystal display devices.

The present invention was developed in view of the above problems and it is an object of the present invention to suppress non-uniformity in cell thickness by reliably positioning spherical spacers at predetermined positions between substrates.

Means for Solving the Problems

In order to achieve the above object, in the present invention, a protruding wall is provided over each display line of an active matrix substrate so as to surround spherical spacers.

More specifically, a liquid crystal display device according to the present invention includes: an active matrix substrate having a plurality of display lines extending in parallel with each other; a counter substrate arranged so as to face the active matrix substrate; a liquid crystal layer interposed between the active matrix substrate and the counter substrate; and spherical spacers disposed between the active matrix substrate and the counter substrate so as to overlap each display line, for defining a thickness of the liquid crystal layer. A protruding wall is provided over each display line of the active matrix substrate so as to surround the spacers.

In the above structure, the spherical spacers disposed between the active matrix substrate and the counter substrate are surrounded by the protruding wall formed over each display line of the active matrix substrate. This structure can prevent the spherical spacers from falling off the display lines of the active matrix substrate even if vibration is applied to the liquid crystal display device. Moreover, the spherical spacers are disposed in a region surrounded by the protruding wall formed over each display line of the active matrix substrate. The spherical spacers can therefore be reliably disposed at predetermined positions between the active matrix substrate and the counter substrate, whereby a predetermined thickness of the liquid crystal layer can be maintained. The spherical spacers can thus be reliably disposed at predetermined positions between the substrates, and non-uniformity of the cell thickness can be suppressed.

The liquid crystal display device may further include a plurality of pixels arranged in a matrix pattern. Each display line may extend between the pixels, and the protruding wall may be provided in every pixel.

In the above structure, the protruding wall is formed in every pixel. Accordingly, a predetermined thickness of the liquid crystal layer is maintained in every pixel, whereby non-uniformity of the cell thickness can further be suppressed.

A width of each display line may be widened in a region where the spacers are disposed.

In the above structure, the width of each display line is widened in the region where the spacers are disposed, and each protruding wall surrounding the spacers becomes larger in size. The spacers can therefore be easily disposed inside each protruding wall.

The spacers may be disposed by an inkjet method.

In the above structure, the width of each display line is widened in the region where the spacers are disposed, and each protruding wall surrounding the spacers becomes larger in size. The spacers can therefore be reliably disposed inside each protruding wall by an inkjet method.

Each display line may be a gate line. The liquid crystal display device may further include a plurality of source lines extending in parallel with each other in a direction crossing the gate lines. A thin film transistor may be provided at each intersection of the gate lines and the source lines. The protruding wall may include at least one of a metal layer that forms the source lines and a semiconductor layer that forms the thin film transistors.

In the above structure, each protruding wall is formed by at least one of a metal layer that forms the source lines and a semiconductor layer that forms the thin film transistors. The protruding wall can therefore be formed over each display line of the active matrix substrate with no additional manufacturing steps.

The protruding wall may include a movement restraining portion for restraining movement of the spacers and a material inlet/outlet portion for introducing and discharging a liquid material.

In the above structure, each protruding wall includes the material inlet/outlet portion for introducing and discharging the liquid material. The liquid material spreads into each protruding wall and its surrounding region through the material inlet/outlet portion.

The material inlet/outlet portion may have a lower height than that of the movement restraining portion.

In the above structure, the liquid material spreads into each protruding wall and its surrounding region through the material inlet/outlet portion having a lower height than that of the movement restraining portion.

The material inlet/outlet portion may be formed by a notch formed along a circumferential direction of the protruding wall.

In the above structure, the liquid material spreads into each protruding wall and its surrounding region through the notch. Moreover, in the case where the protruding walls are conductive, short-circuit caused by the protruding wall can be suppressed by the notch.

The material inlet/outlet portion may be formed by a material inlet/outlet path formed by bending the movement restraining portion or forming a protruding part of the movement restraining portion.

In the above structure, the liquid material spreads into each protruding wall and its surrounding region through the material inlet/outlet path formed by the movement restraining portion.

The liquid material may be an alignment-film forming resin supplied by an inkjet method in order to form an alignment film on a surface of the active matrix substrate.

In the above structure, the alignment-film forming resin such as a polyimide resin spreads into each protruding wall and its surrounding region through the material inlet/outlet portion.

The liquid material may be a liquid crystal material of the liquid crystal layer.

In the above structure, the liquid crystal material supplied to the surface of the active matrix substrate or the counter substrate spreads into each protruding wall and its surrounding region through the material inlet/outlet portion.

The protruding wall may have an inner wall surface standing perpendicularly to a substrate surface and an outer wall surface tilted from the substrate surface toward the inner wall surface.

In the above structure, the inner wall surface of each protruding wall stands perpendicularly to the substrate surface. The spherical spacers are therefore less likely to move over the protruding walls. Movement of the spacers to the outside of the protruding walls is thus restrained. Moreover, since the outer wall surface of each protruding wall is tilted (tapered) from the substrate surface toward the inner wall surface, the liquid material more easily flows over the protruding walls to the inside of the protruding walls.

Effects of the Invention

According to the present invention, a protruding wall is provided over each display line of an active matrix substrate so as to surround spherical spacers. The spherical spacers can therefore be reliably provided at predetermined positions between the substrates, whereby non-uniformity of the cell thickness can be reduced.

DESCRIPTION OF THE REFERENCE NUMERALS

Figure 1:
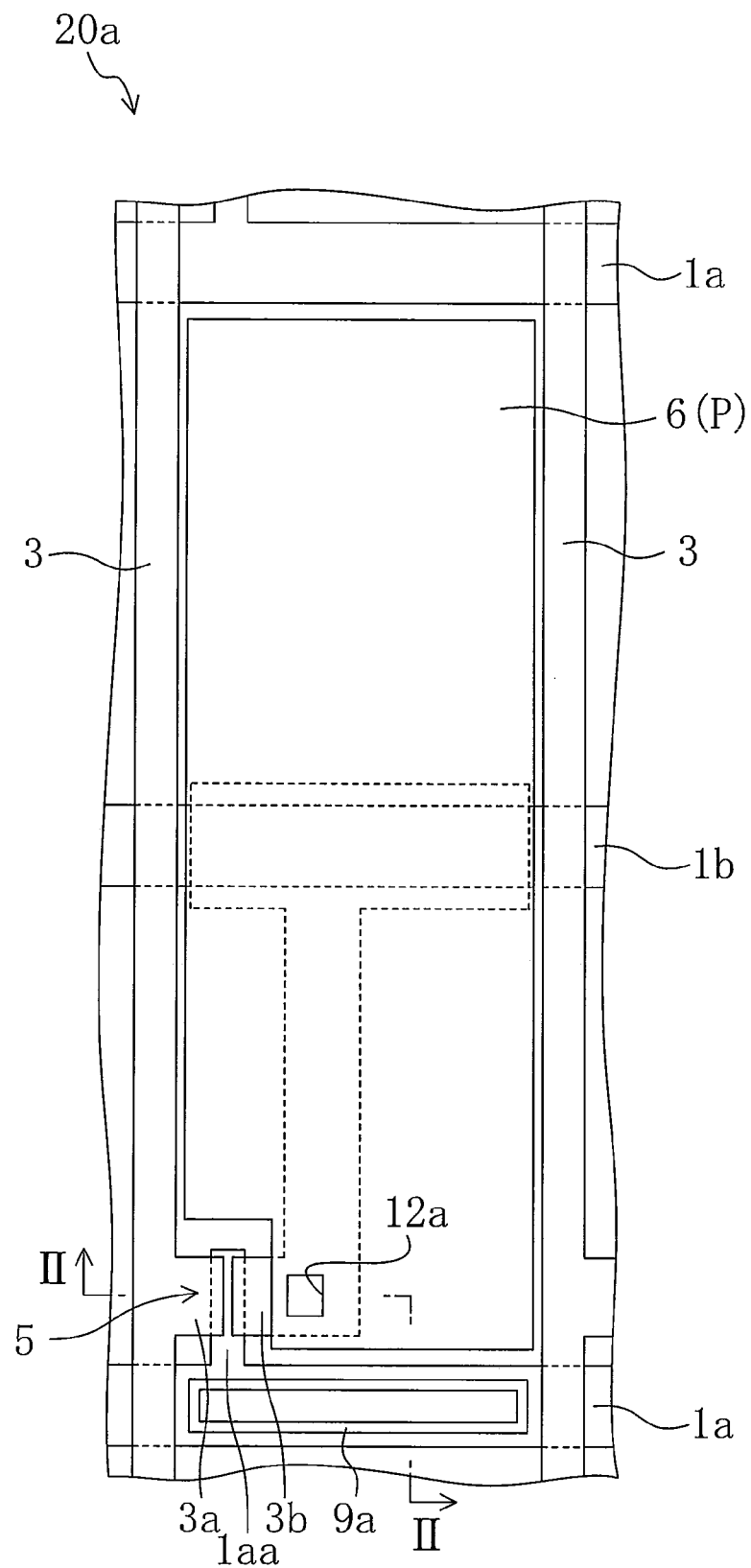
FIG. 1 is a schematic plan view of an active matrix substrate 20a according to a first embodiment.

C notch (material inlet/outlet portion)
L material inlet/outlet path
P pixel
T thinned wall portion (material inlet/outlet portion)
1a gate line (display line)
1b capacitor line (display line)
2a, 2b semiconductor layer
3 source line (display line)
3c source metal layer
5 TFT (thin film transistor)
9a-9g protruding wall (movement restraining portion)
18a alignment film
20a, 20b active matrix substrate
21 spacer
25 liquid crystal layer 30a, 30b counter substrate
50a, 50b liquid crystal display device

BEST MODE FOR CARRYING OUT THE INVENTION

Hereinafter, embodiments of the present invention will be described in detail with reference to the accompanying drawings. Note that the present invention is not limited to the embodiments shown below.

First Embodiment

Figure 2:
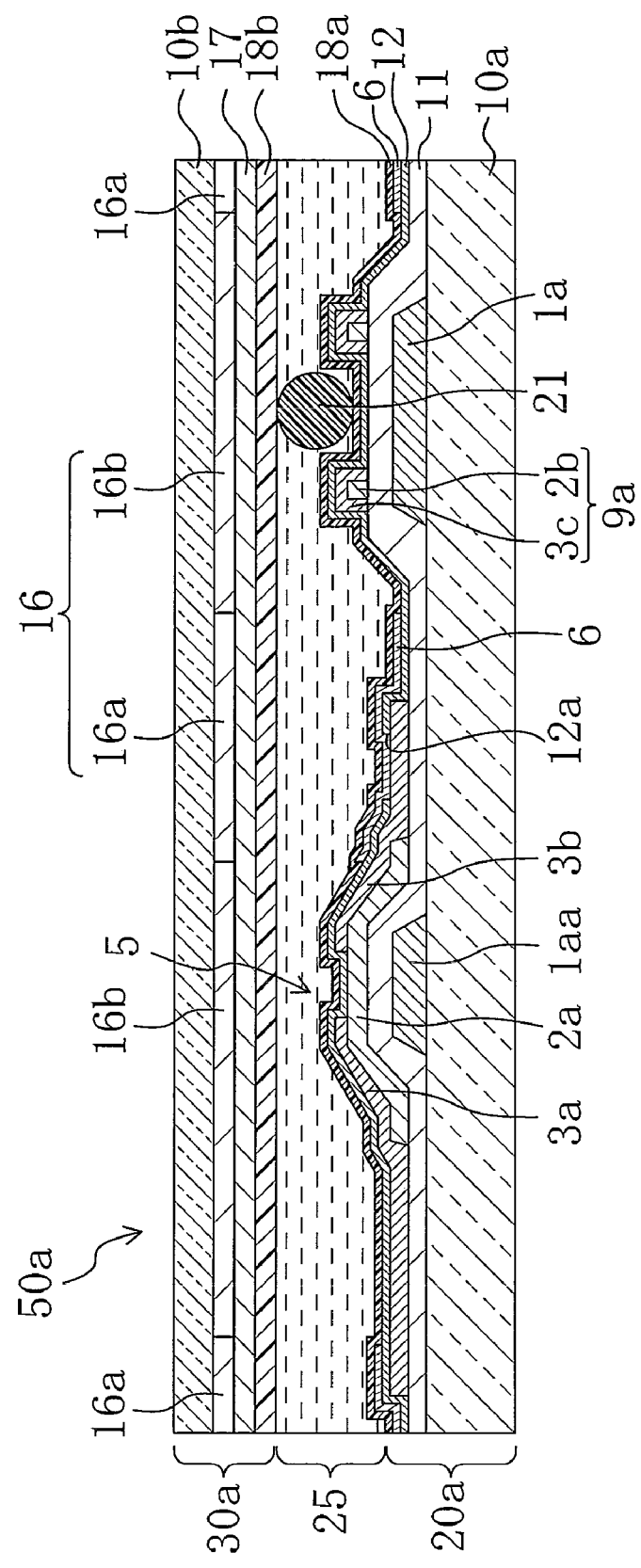
FIG. 2 is a schematic cross-sectional view of a liquid crystal display device 50a taken along line II-II in FIG. 1.

FIGS. 1 and 2 show a first embodiment of a liquid crystal display device of the present invention. More specifically, FIG. 1 is a schematic plan view of an active matrix substrate 20a of the liquid crystal display device according to the present embodiment, and FIG. 2 is a schematic cross-sectional view of the liquid crystal display device 50a of the present embodiment taken along line II-II in FIG. 1.

As shown in FIG. 2, the liquid crystal display device 50a includes an active matrix substrate 20a and a counter substrate 30a which are arranged so as to face each other, a liquid crystal layer 25 interposed between the active matrix substrate 20a and the counter substrate 30a, and spherical spacers 21 disposed between the active matrix substrate 20a and the counter substrate 30a for defining the thickness of the liquid crystal layer 25.

As shown in FIG. 1, the active matrix substrate 20a includes: a plurality of gate lines 1a extending in parallel with each other in a horizontal direction in the figure; a plurality of source lines 3 extending in parallel with each other in a vertical direction in the figure, that is, a direction crossing the gate lines 1a at right angles; thin film transistors (TFTs) 5 provided at respective intersections of the gate lines 1a and the source lines 3; capacitor lines 1b each extending between adjacent gate lines 1a; pixel electrodes 6 each provided corresponding to the respective TFT 5 in a region surrounded by a pair of adjacent gate lines 1a and a pair of adjacent source lines 3; and protruding walls 9a each provided in a rectangular frame shape on each gate line 1a. Each of the protruding walls 9a serves as a movement restraining portion for restraining (limiting) movement of the spacers 21 provided inside the protruding wall 9a, and is formed by a semiconductor layer 2b and a source metal layer 3c which will be described below. In the active matrix substrate 20a, each pixel electrode 6 forms a pixel P, a minimum unit of image display, and the pixels P are arranged in a matrix pattern to form a display region.

As shown in FIGS. 1 and 2, each TFT 5 includes: a gate electrode 1aa that is a laterally protruding portion of the gate line 1a provided on an insulating substrate 10a; a gate insulating film 11 formed so as to cover the gate electrode 1aa; a semiconductor layer 2a formed in an island shape at a position corresponding to the gate electrode 1aa on the gate insulating film 11; and a source electrode 3a and a drain electrode 3b provided on the semiconductor layer 2a so as to face each other. The source electrode 3a is a laterally protruding portion of the source line 3. The drain electrode 3b is connected to the pixel electrode 6 through a contact hole 12a formed in a protective insulating film 12. The drain electrode 3b is extended to a middle region of the pixel P where the capacitor line 1b is formed. The drain electrode 3b thus forms a capacitor electrode. This capacitor electrode forms an auxiliary capacitor together with the capacitor line 1b and the gate insulating film 11.

The active matrix substrate 20a has a multilayer structure in which the gate insulating film 11, the protective insulating film 12, and an alignment film 18a are sequentially formed on the insulating substrate 10a.

The gate line 1a, the gate electrode 1aa, and the capacitor line 1b are provided between the insulating substrate 10a and the gate insulating film 11.

The semiconductor layers 2a and 2b are provided between the gate insulating film 11 and the protective insulating film 12. The source line 3, the source electrode 3a, and the drain electrode 3b are provided on the semiconductor layer 2a, and the source metal layer 3c is provided on the semiconductor layer 2b.

The pixel electrodes 6 are provided between the protective insulating film 12 and the alignment film 18a.

The counter substrate 30a has a multilayer structure in which a color filter layer 16, an overcoat layer (not shown), a common electrode 17, and an alignment film 18b are sequentially formed on an insulating substrate 10b.

The color filter layer 16 includes colored layers 16a provided respectively corresponding to the pixels P and each having one of red, green, and blue colors, and a black matrix 16b provided between the colored layers 16a as a light-shielding film.

The liquid crystal layer 25 is made of a nematic liquid crystal material having electrooptic characteristics.

The spacers 21 are made of beads such as plastic, silica or the like.

The liquid crystal display device 50a having the above structure operates as follows: when the TFT 5 of each pixel P is turned on in response to a gate signal supplied from the gate line 1a, a source signal is supplied from the source line 3 and predetermined charges are written to the pixel electrode 6 through the source electrode 3a and the drain electrode 3b. As a result, a potential difference is produced between the pixel electrode 6 and the common electrode 17 and a predetermined voltage is applied to a liquid crystal capacitor of the liquid crystal layer 25. The liquid crystal display device 50a adjusts the transmittance of incident light applied from outside, based on the fact that the orientation state of liquid crystal molecules changes according to the magnitude of an applied voltage. The liquid crystal display device 50a thus displays an image Hereinafter, a manufacturing method of the liquid crystal display device 50a of the present embodiment will be described with reference to FIGS. 1 and 2. The manufacturing method of the present embodiment includes an active matrix substrate fabrication process, a counter substrate fabrication process, and a liquid crystal display panel fabrication process.

[Active Matrix Substrate Fabrication Process]

First, a metal film such as titanium is deposited with a thickness of about 3,000 Å on the whole surface of an insulating substrate 10a such as a glass substrate by a sputtering method. The metal film is then patterned by photolithography technology (Photo Engraving Process; hereinafter, referred to as "PEP technology") to form gate lines 1a, gate electrodes 1aa, and capacitor lines 1b.

Next, a silicon nitride film or the like is deposited with a thickness of about 3,000 Å by a CVD (Chemical Vapor Deposition) method over the whole substrate having the gate lines 1a, the gate electrodes 1aa, and the capacitor lines 1b formed thereon to form a gate insulating film 11.

An intrinsic amorphous silicon film (thickness: about 1,500 Å) and a phosphorus-doped n+ amorphous silicon film (thickness: about 500 Å) are sequentially deposited by a CVD method over the whole substrate having the gate insulating film 11 formed thereon. The intrinsic amorphous silicon film and the phosphorus-doped n+ amorphous silicon film are then patterned by PEP technology into an island shape on the gate electrodes 1aa and into a rectangular frame shape on the gate lines 1a, thereby forming semiconductor layers 2a and 2b made of the intrinsic amorphous silicon layer and the n+ amorphous silicon layer.

A metal film such as titanium is then deposited with a thickness of about 3,000 Å by a sputtering method over the whole substrate having the gate insulating film 11 and the semiconductor layers 2a and 2b formed thereon. The metal film is then patterned by PEP technology to form source lines 3, source electrodes 3a, drain electrodes 3b, and a source metal layer 3c. Protruding walls 9a made of the semiconductor layer 2b and the source metal layer 3c are thus formed.

The n+ amorphous silicon layer of the semiconductor layer 2a is then etched away by using the source electrodes 3a and the drain electrodes 3b as a mask, whereby channel portions are formed. The TFTs 5 are thus formed.

A silicon nitride film or the like is then deposited with a thickness of about 3,000 Å by a CVD method over the whole substrate having the TFTs 5 formed thereon. Contact holes 12a are then respectively patterned on the drain electrodes 3b by PEP technology. A protective insulating film 12 is thus formed.

An ITO (Indium Tin Oxide) film, a film made of a compound of indium oxide and tin oxide, is then deposited with a thickness of about 1,500 Å by a sputtering method over the whole substrate having the protective insulating film 12 formed thereon. The ITO film is then patterned by PEP technology to form pixel electrodes 6.

Finally, a polyimide resin is applied by an inkjet method to the whole substrate having the pixel electrodes 6 formed thereon. The polyimide resin is then rubbed to form an alignment film 18a.

The active matrix substrate 20a can thus be fabricated.

Note that the semiconductor layer 2a is made of an amorphous silicon film in the above fabrication process of the active matrix substrate 20a. However, the semiconductor layer 2a may be made of a polysilicon film. The amorphous silicon film and the polysilicon film may be laser-annealed in order to improve crystallinity.

[Counter Substrate Fabrication Process]

First, a black-colored photoresist is formed with a thickness of about 2 μm on the whole surface of an insulating substrate 10b such as a glass substrate. The photoresist is then patterned by PEP technology to form a black matrix 16b.

A red, green, or blue-colored photoresist is then formed with a thickness of about 1.8 μm in each region between the black matrices 16b. The photoresist is then patterned by PEP technology to form colored layers 16a. A color filter 16 made of the colored layers 16a and the black matrix 16b is thus formed.

An acrylic resin is then applied to the whole substrate having the color filter 16 formed thereon to form an overcoat layer.

An ITO film is then formed with a thickness of about 1,000 Å over the whole substrate having the overcoat layer formed thereon to form a common electrode 17.

Finally, a polyimide resin is applied by an inkjet method to the whole substrate having the common electrode 17 formed thereon. The polyimide resin is then rubbed to form an alignment film 18b.

A counter substrate 30a can thus be fabricated.

[Liquid Crystal Display Panel Fabrication Process]

First, a sealant curable by the application of ultraviolet light and heat, for example, is printed in a rectangular frame shape by screen printing or the like so as to surround, for example, a display region of the active matrix substrate 20a fabricated in the above active matrix substrate fabrication process.

By an inkjet method, spacers 21 (average particle size: about 2.8 μm) are then disposed, for example, inside each protruding wall 9a formed over the surface of the active matrix substrate 20a having the sealant printed thereon.

A liquid crystal material is then dropped on, for example, the display region of the active matrix substrate 20a having the spacers 21 disposed thereon. The active matrix substrate 20a having the liquid crystal material dropped thereon and the counter substrate 30a fabricated by the counter substrate fabrication process are then aligned and bonded to each other in a vacuum chamber.

Finally, ultraviolet rays are applied to the sealant between the bonded substrates 20a and 30a to pre-cure the sealant. The pre-cured sealant is then cured by heating, whereby the liquid crystal layer 25 is formed.

The liquid crystal display device 50a of the present embodiment can thus be manufactured.

As has been described above, according to the liquid crystal display device 50a of the present embodiment, the spherical spacers 21 disposed between the active matrix substrate 20a and the counter substrate 30a are surrounded by each protruding wall 9a formed over each gate line 1a of the active matrix substrate 20a. This structure can prevent the spacers 21 from falling off the gate lines (seats) 1a of the active matrix substrate 20a even if vibration is applied to the liquid crystal display device 50a. Moreover, since the spacers 21 are disposed in each region surrounded by each protruding wall 9a formed over each gate line 1a of the active matrix substrate 20a, the spacers 21 can be reliably disposed at predetermined positions between the active matrix substrate 20a and the counter substrate 30a, and the spacers 21 are movable only within a limited region. As a result, a predetermined thickness of the liquid crystal layer 25 can be maintained. The spherical spacers 21 can thus be reliably disposed at predetermined positions between the substrates, and non-uniformity of the cell thickness can be suppressed.

Moreover, according to the liquid crystal display device 50a of the present embodiment, the protruding wall 9a is provided in every pixel P. A predetermined thickness of the liquid crystal layer 25 is therefore maintained in every pixel P, whereby non-uniformity of the cell thickness can further be suppressed. Note that the protruding wall 9a is provided in every pixel P in the present embodiment. In the present invention, however, the protruding wall need not necessarily be provided in every pixel. The protruding wall may be provided in every plurality of pixels.

According to the liquid crystal display device 50a of the present embodiment, the protruding walls 9a are made of the source metal layer 3c that forms the source lines 3 and the semiconductor layer 2b that forms the TFTs 5. The protruding walls 9a can therefore be formed on the gate lines 1a of the active matrix substrate 20a with no additional manufacturing steps. Note that, in the present embodiment, the protruding walls 9a are made of the source metal layer 3c and the semiconductor layer 2b. In the present invention, however, the protruding walls may be made of at least one of the source metal layer and the semiconductor layer. The protruding walls may alternatively be made of a material other than the source metal layer and the semiconductor layer. Note that the semiconductor layer 2b may be made of at least one of the intrinsic amorphous silicon layer and the n+ amorphous silicon layer.

Note that, in the present embodiment, the spacers 21 are disposed directly on the surface of the active matrix substrate 20a. In the present invention, however, the spacers 21 may be disposed at corresponding positions on the surface of the counter substrate 30a so that the spacers 21 can be disposed inside each protruding wall 9a on the surface of the active matrix substrate 20a when both substrates are bonded together.

Second Embodiment

FIGS. 3 through 7 show a second embodiment of the liquid crystal display device of the present invention. Note that, in the following embodiments, the same parts as those of FIGS. 1 and 2 are denoted with the same reference numerals and characters and detailed description thereof will be omitted.

In the first embodiment, the protruding walls 9a have a continuous rectangular frame pattern. The protruding walls of the present embodiment, on the other hand, have a movement restraining portion for restraining movement of the spacers 21 and a material inlet/outlet portion for introducing and discharging a liquid crystal material described below. Note that the liquid crystal display device of the present embodiment has substantially the same structure as that of the liquid crystal display device 50a of the first embodiment except the protruding walls.

Figure 3:
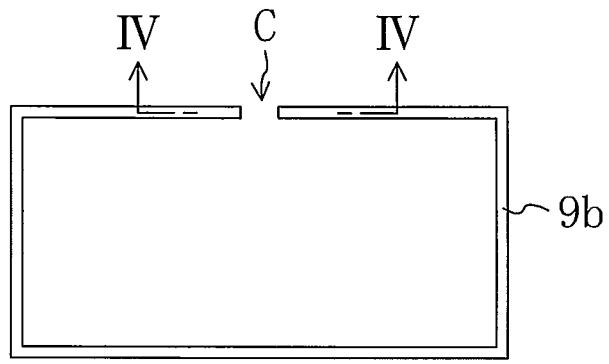
FIG. 3 is a schematic plan view of a protruding wall 9b of an active matrix substrate according to a second embodiment.
Figure 4:
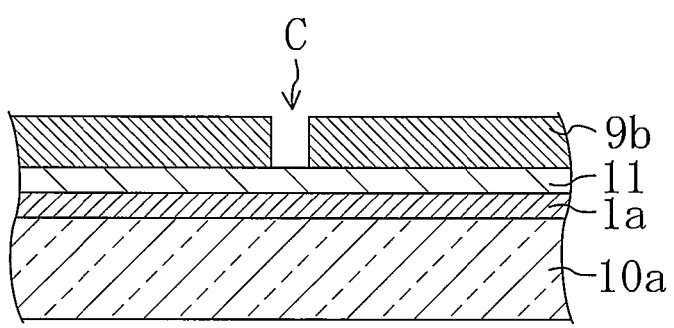
FIG. 4 is a schematic cross-sectional view of the protruding wall 9b taken along line IV-IV in FIG. 3.
Figure 5:
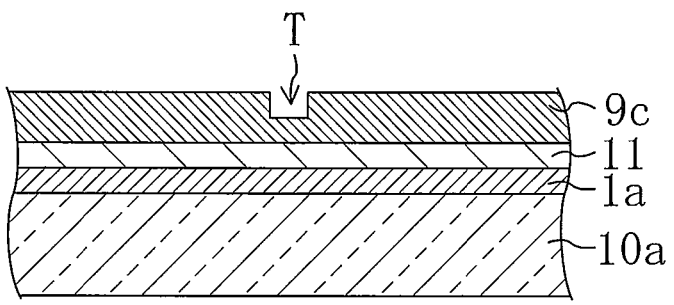
FIG. 5 is a schematic cross-sectional view of a protruding wall 9c of a modification.
Figure 6:
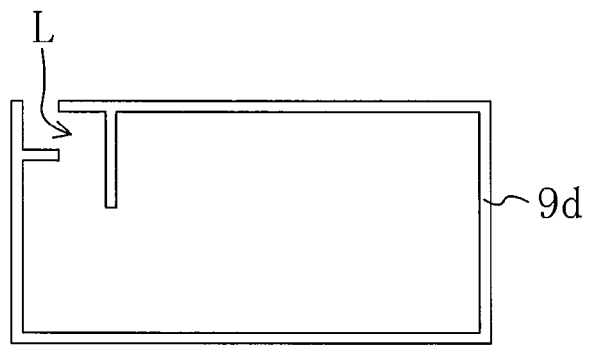
FIG. 6 is a schematic plan view of a protruding wall 9d of a modification.

FIG. 3 is a schematic plan view of a protruding wall 9b in an active matrix substrate of the liquid crystal display device of the present embodiment. FIG. 4 is a schematic cross-sectional view of the protruding wall 9b taken along line IV-IV in FIG. 3.

As shown in FIGS. 3 and 4, the protruding wall 9b has a notch C formed along a circumferential direction of the protruding wall 9b. The protruding wall 9b itself functions as a movement restraining portion and the notch C functions as a material inlet/outlet portion. As shown in a protruding wall 9c of FIG. 5, instead of the notch C, a thinned wall portion T having a lower height than that of the movement restraining portion may be used as the material inlet/outlet portion. As shown in a protruding wall 9d of FIG. 6, a material inlet/outlet path L formed by forming a protruding part in the movement restraining portion may alternatively be used as the material inlet/outlet portion. Note that the protruding walls 9b through 9d can be formed by merely changing the pattern shape for forming the protruding wall 9a described in the first embodiment.

According to the active matrix substrate having the protruding walls 9b, 9c or 9d of the present embodiment and the liquid crystal display device having this active matrix substrate, each protruding wall 9b, 9c, or 9d has the notch C, the thinned wall portion T, or the material inlet/outlet path L as the material inlet/outlet portion. The following effect can therefore be obtained in addition to the effects described in the first embodiment: when a resin for forming an alignment film such as a polyimide resin is applied by an inkjet method and a liquid crystal material is dropped, the resin and the liquid crystal material can be made to spread into the protruding walls 9b, 9c, or 9d and their surrounding regions through the material inlet/outlet portions.

The slit (the material inlet/outlet path L) of the protruding wall 9d has a more complex shape than that of the slit (the notch C) of the protruding wall 9b. The spacers 21 disposed inside the protruding wall 9d are less likely to move out of the protruding wall 9b.

Figure 7:
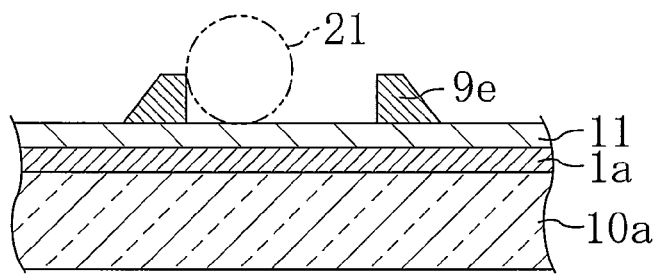
FIG. 7 is a schematic cross-sectional view of a protruding wall 9e of a modification.

Note that, in each of the above embodiments, the protruding walls 9a through 9d have an approximately rectangular transverse section. As shown in FIG. 7, however, a protruding wall 9e may have an inner wall surface standing perpendicularly to the substrate surface and an outer wall surface tapered from the substrate surface toward the inner wall surface. Since the inner wall surface of the protruding wall 9e stands perpendicularly to the substrate surface, the spherical spacers 21 are less likely to move over the protruding wall 9e. Movement of the spacers 21 to the outside of the protruding wall 9e can thus be restrained. Moreover, since the outer wall surface of the protruding wall 9e is tilted from the substrate surface toward the inner wall surface, a liquid material such as a resin for forming an alignment film and a liquid crystal material more easily flows over the protruding wall 9e into the inside of the protruding wall 9e.

Third Embodiment

Figure 8:
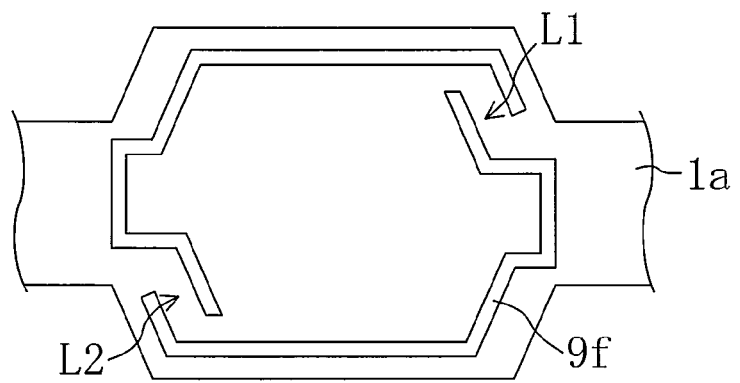
FIG. 8 is a schematic plan view of a gate line 1a and a protruding wall 9f of an active matrix substrate according to a third embodiment.

FIG. 8 shows a third embodiment of the liquid crystal display device according to the present invention. More specifically, FIG. 8 is a schematic plan view of a gate line 1a and a protruding wall 9f in an active matrix substrate of the liquid crystal display device of the present embodiment.

In the active matrix substrate of the liquid crystal display device of the present embodiment, as shown in FIG. 8, the width of each gate line 1a is partially widen, and the protruding wall 9f is formed along the peripheral end of the wide part of the gate line 1a. More specifically, each gate line is has a line width of about 45 µm at each intersection with the source lines 3 and the wide part of each gate line 1a has a size of about 100 µm by about 120 µm. The pitch of the gate lines 1a is about 530 µm. Each source line 3 (not shown in FIG. 8) has a line width of about 10 µm and the pitch of the source lines 3 is about 180 µm. As shown in FIG. 8, the protruding wall 9f has a bent shape and material inlet/outlet paths L1 and L2 are formed at both ends of the protruding wall 9f.

According to the active matrix substrate having the protruding walls 9f of the present embodiment and the liquid crystal display device including this active matrix substrate, the width of each gate line 1a is widen in a region where the spacers 21 are disposed, and the protruding wall 9f surrounding the spacers 21 is larger in size. The following effect can therefore be obtained in addition to the effects described in the first and second embodiments: the spacers 21 can be easily disposed inside each protruding wall 9f. Especially when the spacers 21 are disposed by an inkjet method, a print head (nozzle) for ejecting a dispersion containing the spacers 21 ejects the dispersion while being moved along a horizontal direction (X direction or Y direction). The spacers 21 are therefore disposed at a relatively low accuracy (e.g., about ±20 µm) in this method. Accordingly, forming such large protruding walls 9f enables the spacers 21 to be reliably disposed inside each protruding wall 9f.

Fourth Embodiment

Figure 9:
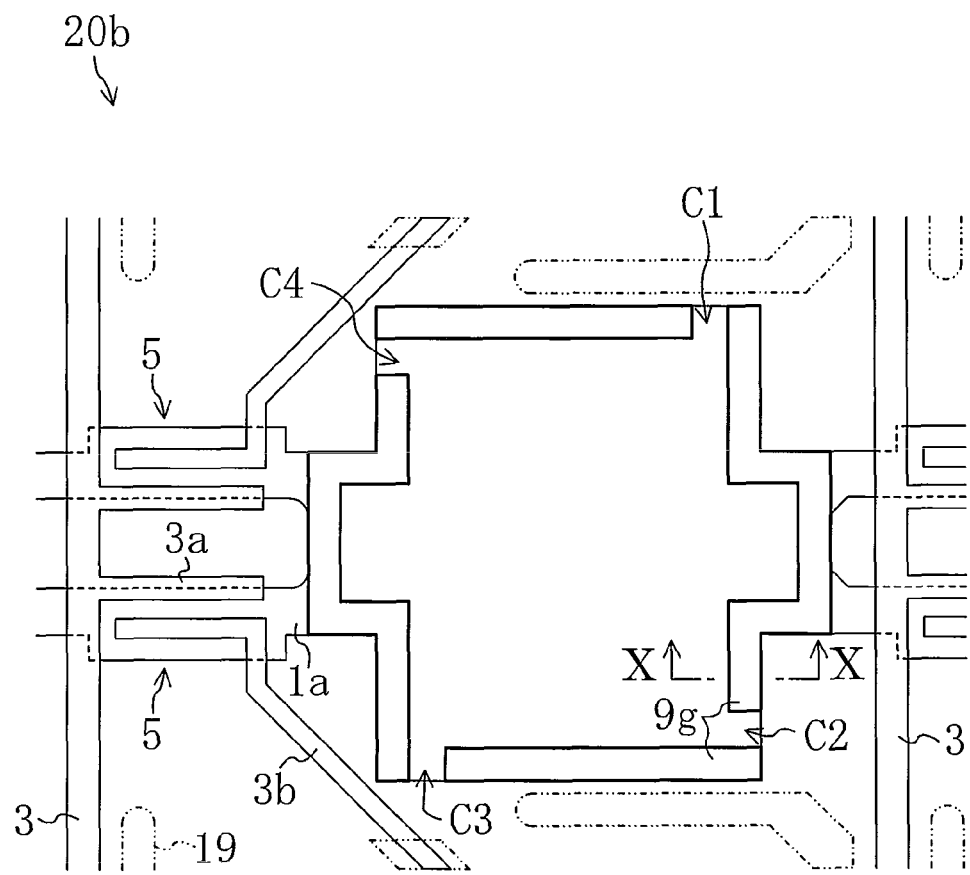
FIG. 9 is a schematic plan view of an active matrix substrate 20b according to a fourth embodiment.
Figure 10:
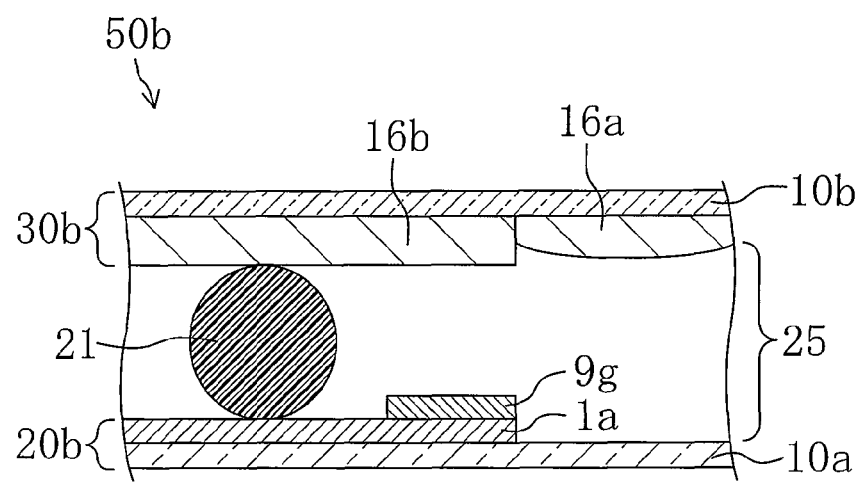
FIG. 10 is a schematic cross-sectional view of a liquid crystal display device 50b taken along line X-X in FIG. 9.
Figure 11:
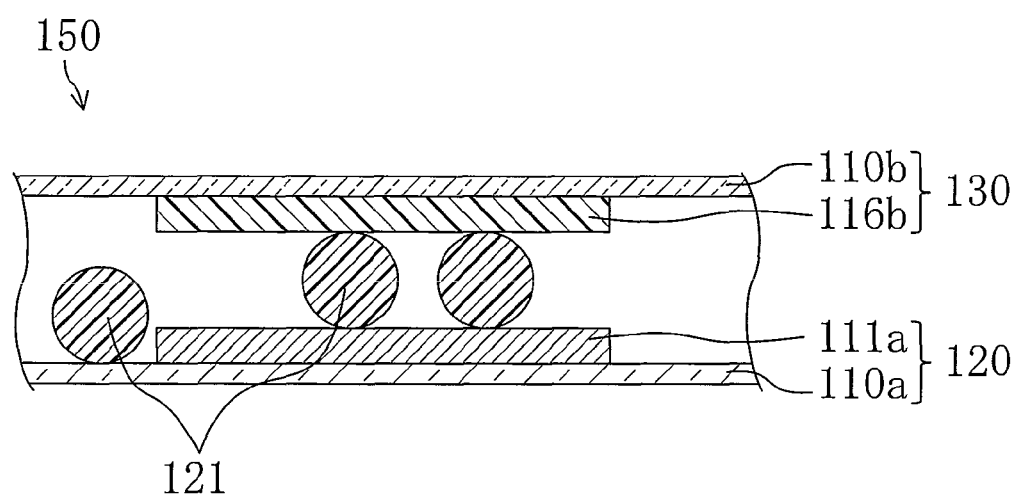
FIG. 11 is a schematic cross-sectional view of a conventional liquid crystal display device 150.

FIGS. 9 and 10 show a fourth embodiment of the liquid crystal display device according to the present invention. More specifically, FIG. 9 is a schematic plan view of an active matrix substrate 20b of the liquid crystal display device of the present embodiment. FIG. 10 is a schematic cross-sectional view of a liquid crystal display device 50b taken along line X-X in FIG. 9. Note that, in FIGS. 9 and 10, elements are shown in a simplified manner. For example, pixel electrodes are not shown in the figures.

As shown in FIG. 10, the liquid crystal display device 50b includes an active matrix substrate 20b and a counter substrate 30b which are arranged so as to face each other, a vertical alignment type liquid crystal layer 25 interposed between the active matrix substrate 20b and the counter substrate 30b, and spherical spacers 21 disposed between the active matrix substrate 20b and the counter substrate 30b for defining the thickness of the liquid crystal layer 25.

As shown in FIG. 9, in the active matrix substrate 20b, the width of each gate line 1a is partially widen as in the third embodiment and each gate line 1a is branched into two at each intersection with the source lines 3. In the active matrix substrate 20b, each branch of the gate line 1a serves as a gate electrode of a corresponding TFT 5. Two TFTs 5 are therefore formed in every pixel P. In the active matrix substrate 20b, a protruding wall 9g divided by notches C1 through C4 is formed along the peripheral end of the wide part of each gate line 1a.

As shown in FIG. 9, the counter substrate 30b has, for example, ribs 19 in addition to the elements of the counter substrate 30a described in the first embodiment. The ribs 19 are provided between the common electrode 17 and the alignment film 18b and serve as an alignment center of the liquid crystal layer 25. Note that the ribs 19 can be formed by, for example, applying a photosensitive acrylic resin or the like to the whole substrate having the common electrode 17 formed thereon, and then patterning the photosensitive acrylic resin by PEP technology.

When no voltage is applied to the liquid crystal layer 25, liquid crystal molecules in a nematic liquid crystal material have a negative dielectric anisotropy ($\Delta\varepsilon<0$) so that the liquid crystal molecules are oriented substantially vertically to the substrate surface.

When no voltage is applied to the liquid crystal layer 25 of the liquid crystal display device 50b, liquid crystal molecules are oriented substantially vertically to the substrate surface. When a voltage is applied to the liquid crystal layer 25, the liquid crystal molecules are oriented in all directions centered on the ribs 19a and substantially in parallel with the substrate surface. As a result, a wide viewing angle and fast response can be achieved.

According to the liquid crystal display device 50b of the present embodiment, each protruding wall 9g is divided into four portions. Therefore, the following effect can be obtained in addition to the effects described in the first to third embodiments: even if the conductive protruding wall 9g and, for example, the source line 3 of an adjacent pixel P are short-circuited due to a conductive foreign particle or the like adhering therebetween, the influence of the short-circuit on display quality can be reduced.

Note that each of the above embodiments shows a liquid crystal display device having the protruding walls 9a through 9g formed on the gate lines 1a. In the present invention, however, the protruding walls may be formed on the source lines 3 or the capacitor lines 1b by using other constituent materials. The protruding walls having the shape described in each of the above embodiments may alternatively be formed on the counter substrate 30b by using the material of the ribs 19 on the counter substrate 30b.

INDUSTRIAL APPLICABILITY

As has been described above, the present invention can implement high display quality in a liquid crystal display device that is manufactured by using an inkjet method. The present invention is therefore useful for large-screen liquid crystal televisions and the like.

The invention claimed is:

1. A liquid crystal display device, comprising:
an active matrix substrate having a plurality of display lines extending in parallel with each other;
a counter substrate arranged so as to face the active matrix substrate;
a liquid crystal layer interposed between the active matrix substrate and the counter substrate; and
spherical spacers disposed between the active matrix substrate and the counter substrate so as to overlap each display line, for defining a thickness of the liquid crystal layer,
wherein a protruding wall is provided over each display line of the active matrix substrate so as to surround the spacers,
wherein the protruding wall includes a movement restraining portion for restraining movement of the spacers and a material inlet/outlet portion for introducing and discharging a liquid material, and
wherein the material inlet/outlet portion is formed by a notch formed along a circumferential direction of the protruding wall.

2. The liquid crystal display device according to claim 1, further comprising:
a plurality of pixels arranged in a matrix pattern,
wherein each display line extends between the pixels, and the protruding wall is provided in every pixel.

3. The liquid crystal display device according to claim 1, wherein each display line is a gate line,
the liquid crystal display device further comprises a plurality of source lines extending in parallel with each other in a direction crossing the gate lines,
a thin film transistor is provided at each intersection of the gate lines and the source lines, and
the protruding wall includes at least one of a metal layer that forms the source lines and a semiconductor layer that forms the thin film transistors.

4. The liquid crystal display device according to claim 1, wherein the material inlet/outlet portion has a lower height than that of the movement restraining portion.

5. The liquid crystal display device according to claim 1, wherein the liquid material is an alignment-film forming resin supplied by an inkjet method in order to form an alignment film on a surface of the active matrix substrate.

6. The liquid crystal display device according to claim 1, wherein the liquid material is a liquid crystal material of the liquid crystal layer.

7. The liquid crystal display device according to claim 1, wherein the protruding wall has an inner wall surface standing perpendicularly to a substrate surface and an outer wall surface tilted from the substrate surface toward the inner wall surface.

8. A liquid crystal display device, comprising:
an active matrix substrate having a plurality of display lines extending in parallel with each other;
a counter substrate arranged so as to face the active matrix substrate;
a liquid crystal layer interposed between the active matrix substrate and the counter substrate; and
spherical spacers disposed between the active matrix substrate and the counter substrate so as to overlap each display line, for defining a thickness of the liquid crystal layer,
wherein a protruding wall is provided over each display line of the active matrix substrate so as to surround the spacers,
wherein the protruding wall includes a movement restraining portion for restraining movement of the spacers and a material inlet/outlet portion for introducing and discharging a liquid material, and
wherein a width of each display line is widened in a region where the spacers are disposed.

9. The liquid crystal display device according to claim 8, wherein the spacers are disposed by an inkjet method.

10. A liquid crystal display device, comprising:
an active matrix substrate having a plurality of display lines extending in parallel with each other;
a counter substrate arranged so as to face the active matrix substrate;
a liquid crystal layer interposed between the active matrix substrate and the counter substrate; and
spherical spacers disposed between the active matrix substrate and the counter substrate so as to overlap each display line, for defining a thickness of the liquid crystal layer,
wherein a protruding wall is provided over each display line of the active matrix substrate so as to surround the spacers,
wherein the protruding wall includes a movement restraining portion for restraining movement of the spacers and a material inlet/outlet portion for introducing and discharging a liquid material, and
wherein the material inlet/outlet portion is formed by a material inlet/outlet path formed by bending the movement restraining portion or forming a protruding part of the movement restraining portion.

* * * * *